June 10, 1969 M. E. BINKLEY ET AL 3,449,141
EFFECT OF CRYOLITE ON CALCIUM SILICATE COMPOSITIONS
Original Filed Oct. 23, 1965
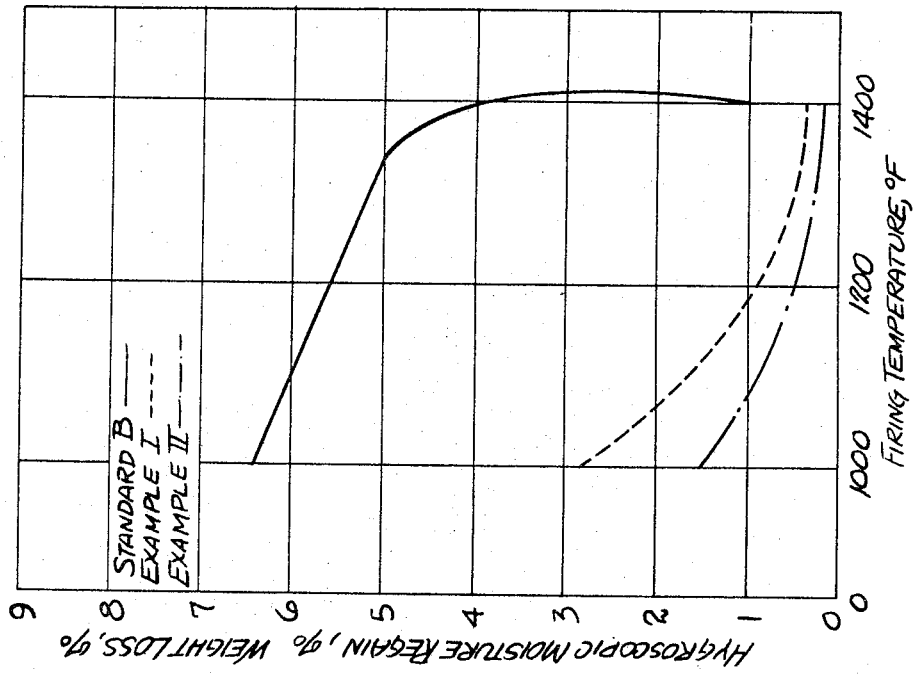
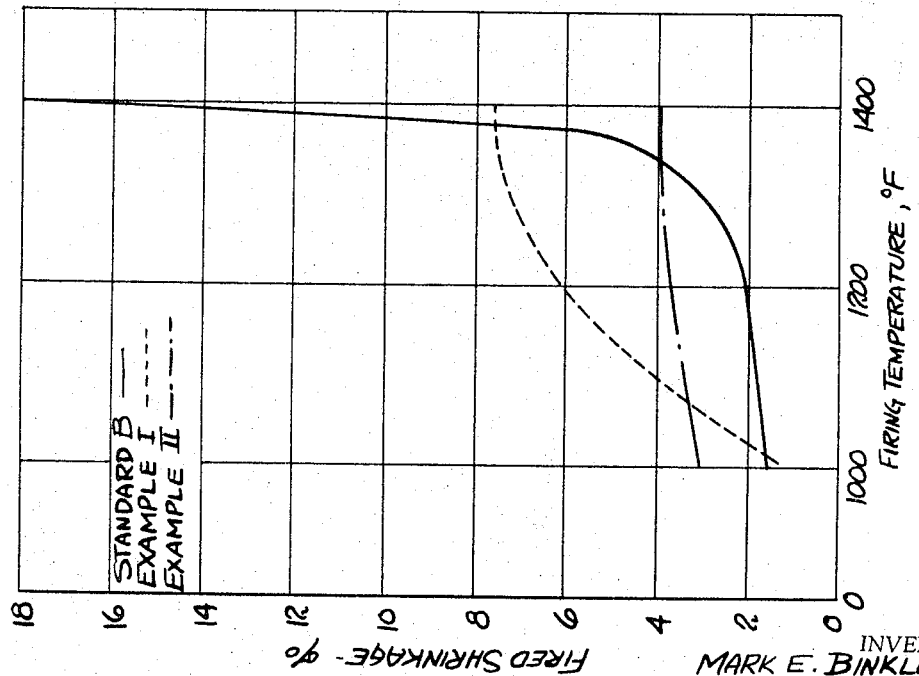
INVENTORS
MARK E. BINKLEY
OSBORN AYERS
BY
ATTORNEY

United States Patent Office 3,449,141
Patented June 10, 1969

3,449,141
EFFECT OF CRYOLITE ON CALCIUM SILICATE COMPOSITIONS
Mark E Binkley, Somerville, and Osborn Ayers, Westfield, N.J., assignors to Johns-Manville Corporation, New York, N.Y., a corporation of New York
Continuation of application Ser. No. 503,173, Oct. 23, 1965. This application Aug. 8, 1968, Ser. No. 753,842
Int. Cl. C07b 7/34, 7/44
U.S. Cl. 106—120    10 Claims This application is a continuation of application Ser. No. 503,173, filed Oct. 23, 1965, and now abandoned.

This invention comprises an improved structural insulating product and a method of effecting the improvements therein. More specifically, this invention relates to hydrated calcium silicate insulating products of the type set forth in U.S. Letters Patent No. 2,247,355, No. 2,326,516 and No. 2,326,517 to Brown, and is directed to novel means of improving the same and the novel products of the means.

Hydrated calcium silicate structural insulation materials of the type disclosed in the aforementioned patents have been on the market for a number of years and have attained considerable success in a variety of diverse applications attributable to their stable structural integrity and strength over temperature conditions ranging up to about 1200° F. or higher, and their effective thermal insulating properties throughout such temperature. The applications of these materials comprise, for example, fire resistant shipboard wall or bulkhead panels, and fire walls generally, construction material for ovens, dryers, etc. and components therefor; a wide variety of thermal insulating applications such as steam or other hot pipes, tanks, furnaces, etc.; a construction material for containers or vessels, conduits, molds, etc., for non-ferrous molten metal handling, among numerous others. At temperatures of approximately 1300° F., however, the common hydrated calcium silicate structures commence to falter as is evidenced by their susceptibility to excessive shrinkage at temperatures in excess thereof, and thereafter the structural deterioration and accompanying shrinkage frequently progresses so rapidly as to limit the use of such calcium silicate compositions or products thereof in many potential applications enduring temperatures in excess of about 1300° F.

It is the primary object of this invention to provide economical and practical means of increasing the effective temperature limits of common hydrated calcium silicate compositions, or products thereof comprising a hydrated calcium silicate integrating or bonding matrix, by effectively controlling and minimizing shrinkage at temperatures in excess of 1300° F.

It is also a primary object of this invention to provide effective means of modulating and significantly retarding structural shrinkage and degradation to a tolerative level throughout temperatures ranging up to at least about 1400° F. or greater.

It is a further object of this invention to provide effective and economical means of reducing the frequently detrimental hygroscopic moisture regain after exposure to high temperatures in common hydrated calcium silicate compositions or products comprising a hydrated calcium silicate integrating structure or matrix.

It is a still further object of this invention to provide structural insulations comprising hydrated calcium silicates of markedly improved temperature resistance exhibited by minimal shrinkage at temperatures ranging at least up to 1400° F. and subsequent moisture regained.

This invention will be more fully understood and further objects and advantages thereof will become apparent from the hereinafter detailed description and their drawings in which:

FIG. 1 is a graph showing a comparison of fired shrinkage characteristics of the improved products of this invention with like conventional products.

FIG. 2 is a graph showing a comparison of the hygroscopic moisture regain of the improved products of this invention with like conventional products.

This invention comprises the discovery that the addition or inclusion of a relatively small amount of cryolite, sodium fluoro-aluminate, having the formula $Na_3AlF_6$ or $3NaF \cdot AlF_3$, to typical lime and silica, etc., reactants prior to hydrothermal reaction and conversion thereof to hydrated calcium silicate gels and the integrated structures formed thereby, markedly retards the shrinkage of such materials at relatively high temperature conditions comprising those well beyond its limits without this beneficial agent, i.e. temperatures extending from 1200° F. to 1400° F. or greater. Moreover an added and also unexpected advantage attributable to the presence of cryolite in the resultant hydrated calcium silicate gel material, comprises an appreciable reduction in the hygroscopic moisture regain therein following exposure to high temperatures. Pronounced improvements and advantages in both shrinkage, for example up to 50% reduction at 1400° F., and moisture regained are effectively and economically achieved through the incorporation of only about 2% up to about 12% or 15%, depending upon particle size and in turn reactivity, of cryolite by weight of the initial solid reactants and components, essentially comprising line and hydrothermally reactive silica such as described in the prior art, for example the above identified patents. Additions in excess of about 12% to 15% by weight of cryolite are not recommended primarily because of a tendency to detrimental effects due thereto in the adulteration and retardation of strengths of the hydrated products.

The novel and advantageous means of this invention are directed to and comprise improvements in hydrothermal reaction products of lime and silica, and materials comprising various resultant hydrated calcium silicate compositions as the integrating or bonding matrix and structure thereof. These common reactants or materials and the products thereof are amply illustrated by the aforementioned U.S. Patents, viz., Nos. 2,247,355, 2,326,516 and 2,326,517, and briefly include the reacted and indurated hydrated calcium silicate gel compositions formed by autoclaving in a steam atmosphere at temperatures of at least about 212° F. up to 400° F. (235 p.s.i.) or greater, over periods of normally of at least about 5 hours to about 36 hours or longer, and typically of approximately 338° F. (100 p.s.i.) for about 18 hours, a wet admixture including lime and a hydrothermally reactive source of silica comprising diatomaceous earth, tripoli, silica gel, sand or quartz, etc. The duration of the autoclaving period is usually inversely proportional to the temperature, and further depends to a great extent upon the mass of the body and/or the autoclave load since such factors affect temperature penetration rates. The ratio of the lime to reactive silica normally ranges from about 1 to about 4 parts by weight of silica per part by weight of hydrated lime.

Typically such compositions or products thereof contained asbestos or the like non-reactive fiber, primarily as a mechanical reinforcement. Other common ancillary ingredients include reactive clays, hydraulic cements such as portland, and various non-reactive minerals, fillers or aggregates, pigments, opacifying agents, etc.

The products or articles embodying these compositions and reactions are generally formed by dispersing and slurrying the apt reactants, and any other ingredients therefor, in water and shaping the water suspended solids and entrained water by filter-molding or pan casting the ingredients to the configuration desired, all according to conventional procedures, and then autoclaving the shaped or pan-casted body. The aqueous slurry of dispersed solid ingredients is dewatered and consolidated by molding to such a degree, or the concentration of such slurry for pan-casting is so controlled whereby the density of the resultant hydrothermally reacted and dried body or product is at least about 30 up to about 70 pounds per cubic foot pursuant to conventional practices. Preferred typical product densities for strong structural materials of good insulating properties comprise about 40 to 50 pounds per cubic foot, however where high thermal insulating efficiency is paramount and overriding strength considerations, and means of this invention are applicable to products having densities as low as about 10 p.c.f.

Apt formulations or ranges therefor for the practice of the present invention comprise broadly and preferably the following proportions of basic and essential ingredients.

| Ingredients | Broad range | Preferred range |
| --- | --- | --- |
| Asbestos fiber | 0–50 | 10–40 |
| Hydrated lime | 10–50 | 10–45 |
| Silica | 25–85 | 25–45 |
| Cryolite | 2–15 | 5–12 |
| Clay | 0–25 | 0–10 |

The following examples comprise illustrations of the preferred and typical means and technique for the practice of this invention and demonstrate the advantages and utility thereof. It is to be appreciated that the specific compositions or means, other than the cryolite, conditions and techniques given for carrying out this invention in the examples are primarily exemplary and are not to be construed as limiting this invention to any specific composition(s), method(s) or condition(s) set forth therein.

The products of each of the illustrative formulations of this invention constituting Examples 1, 2 and 3 given hereinafter and of the formulations provided as standards embodying prior art materials, were produced with like materials, means and conditions as follows. The solid ingredients of the specified formulations were respectively dispersed and uniformly admixed in water in approximate ratios of about 8.5 parts by weight of water per part by weight of the total solids. Apt like proportions of the resultant slurry of each formulation calculated to provide a body measuring 4 feet x 8 feet x 1 inch thick and of a final or reacted and dried density in the order of 45 pounds per cubic foot were filter press molded, applying pressures of about 850 to 1000 pounds per square inch, to slightly oversized dimensions to enable subsequent trimming and sanding if desired. The resultant substantially dewatered and consolidated shaped bodies were steam cured for about 18 hours at approximately 338° F. or 100 pounds per square inch in a typical autoclave.

Several samples of each formulation were examined and apt determinations made both before and after heat soaking at 1400° F. for 24 hours. The illustrative formulations of this invention constituting Examples 1, 2 and 3, and of the standards constituting prior art materials, and pertinent data derived from averages of several samples of each comprising their hygroscopic moisture regain and shrinkage or durability upon long term exposure to high temperatures are all set forth in tabular form. The percentage moisture regain is calculated on the basis of dry weight of the piece, determined by exposure to 250° F. temperature in an oven until no further weight reduction is observed, and the increased weight of the piece resulting from subjecting it to a 50% relative humidity at 70° F. for 5 days, both before and after the heat soaking treatment of 24 hours at 1400° F. or other given temperatures. The percentage shrinkage is simply calculated on the basis of the change in actual dimensions of a piece as a result of the said heat soaking conditions given.

| Ingredients | Examples | | | Standards | |
| --- | --- | --- | --- | --- | --- |
| | I | II | III | A | B |
| Ingredients: | | | | | |
| Asbestos | 20 | 20 | 20 | 20 | 40 |
| Diatomaceous silica | 60 | 58 | 55 | 65 | 30 |
| Lime | 15 | 15 | 15 | 15 | 30 |
| Cryolite | 5 | 7 | 10 | | |
| Properties: | | | | | |
| Dry density, p.c.f. | 44 | 49 | 37 | 46 | 37.5 |
| Moisture regain, percent: | | | | | |
| Original | 3.70 | 2.66 | 2.37 | 4.28 | 5.07 |
| After 24 hr. at 1,400° F. | 0.27 | 0.21 | 0.14 | 0.40 | 0.85 |
| Shrinkage, percent after 24 hr. at 1,400° F.: | | | | | |
| Length | 1.50 | 1.04 | 0.83 | 1.65 | 2.04 |
| Width | 1.54 | 1.06 | 0.84 | 1.76 | 2.47 |
| Thickness | 7.42 | 3.33 | 1.22 | 8.49 | 17.89 |

The average thickness shrinkage and hygroscopic moisture regain for a number of samples of the compositions of Examples 1 and 2 of this invention and with like properties for a sample of the composition as given in Standard B are given and plotted in FIGURES 1 and 2 of the drawing upon exposure to heat soaking temperature ranging from 1000° F. up to 1400° F., providing a ready means of demonstrating and comparing the effects of the inclusion of only minor amounts of cryolite in the steam cured and hydrothermally reacted hydrated calcium silicate products of this invention.

It is to be understood that the foregoing details are given for the purpose of illustration and not restriction and that variations within the spirit of the invention are to be included within the scope of the appended claims.

What we claim is:

1. A method of retarding shrinkage at high temperature and hygroscopic moisture regained in compositions having an integrating structural matrix of hydrothermally reacted hydrated calcium silicate products of lime and silica, comprising autoclaving a wet admixing consisting essentiall, in approximate percentages by weight, of:

Asbestos fiber _____ 0 to 50
Lime _____ 10 to 50
Silica _____ 25 to 85
Cryolite _____ 2 to 15
Clay _____ 0 to 25 in steam at a temperature of at least approximately 212° F. up to approximately 450° F. for a period of at least about 5 hours and thereby effecting hydrothermal reaction of the lime with the silica forming the hydrate calcium silicate structural integrating matrix.

2. The method of claim 1 comprising autoclaving a wet admixture consisting essentially in approximate percentages by weight, of:

Asbestos fiber _____ 10 to 40
Lime _____ 10 to 45
Silica _____ 25 to 45
Cryolite _____ 5 to 12
Clay _____ 0 to 10 in steam at a temperature of at least approximately 212° F. to approximately 450° F. for a period of at least about 5 hours and thereby effecting hydrothermal reaction of the lime with the silica forming the hydrated calcium silicate integrating structural matrix.

3. The method of claim 1 comprising autoclaving a wet admixture consisting essentially, in approximate percentages by weight, of:

Asbestos fiber _____ 10 to 40
Lime _____ 10 to 45
Silica _____ 25 to 45
Cryolite _____ 5 to 12 in steam at a temperature of approximately 350° F. for a period of about 5 to about 36 hours and thereby effecting hydrothermal reaction of the lime with the silica forming the hydrated calcium silicate integrating structural matrix.

4. The method of claim 1 comprising autoclaving a wet admixture consisting essentiall, in approximate percentegese by weight, of:

| | |
|---|---:|
| Asbestos fiber | 20 |
| Lime | 15 |
| Silica | 60 |
| Cryolite | 5 | in steam at a temperature of approximately 350° F. for a period of about 5 hours to about 36 hours and thereby effecting hydrothermal reaction of lime with the silica forming the hydrate calcum silicate integrating structural matrix.

5. The method of claim 1 comprising autoclaving a wet admixture consisting essentiall, in approximate percentages by weight, of:

| | |
|---|---:|
| Asbestos fiber | 20 |
| Lime | 15 |
| Silica | 58 |
| Cryolite | 7 | in a steam at a temperature of approximtely 350° F. for a period of 5 hours to about 36 hours and thereby effecting hydrothermal reaction of lime with the silica forming the hydrated calcium silicate integrating structural matrix.

6. The method of claim 1 comprising autoclaving a wet admixture consisting essentially, in approximate percentages by weight, of:

| | |
|---|---:|
| Asbestos fiber | 20 |
| Lime | 15 |
| Silica | 55 |
| Cryolite | 10 | in steam at a temperature of approximately 350° F. for a period of 5 hours to about 36 hours and thereby effecting hydrothermal reaction of hydrated lime with the silica forming the hydrated calcium silicate integrating structural matrix.

7. An improved high temperature resistant composition with an integrating structural matrix of hydrothermally reacted, hydrated calcium silicate products of lime and silica having increased resistance to shrinkage at high temperatures and reduced hygroscopic moisture regained, said insulating product comprising a self-supporting, integrating structural matrix of hydrated calcium silica consisting of the hydrothermal reaction product of autoclaving a wet admixture consisting essentially, in approximate percentages by weight, of:

| | |
|---|---:|
| Asbestos fiber | 10 to 40 |
| Lime | 10 to 50 |
| Silica | 25 to 85 |
| Cryolite | 2 to 15 |
| Clay | 0 to 25 | in steam at a temperature of at least approximately 212° F. up to approximately 450° F. for a period of at least about 5 hours.

8. The improved composition of claim 7 having an overall density of about 10 to about 70 pounds per cubic foot.

9. The improved composition of claim 7 comprising a fiber reinforced, self-supporting integrating structural matrix of hydrated calcium silicate consisting of the hydrothermal reaction product of autoclaving a wet admixture consisting essentially, in approximate percentages by weight, of:

| | |
|---|---:|
| Asbestos fiber | 10 to 40 |
| Lime | 10 to 45 |
| Silica | 25 to 45 |
| Cryolite | 5 to 12 | at a temperature of at least approximately 212° F., up to approximately 450° F. for a period of about 5 hours to about 36 hours.

10. The improved composition of claim 9 having an overall density of about 30 to 70 pounds per cubic foot.

References Cited

UNITED STATES PATENTS

| 2,665,996 | 1/1954 | Kalousek | 106—120 |
| 3,116,158 | 12/1963 | Taylor | 106—120 |
| 3,227,570 | 1/1966 | Bishop | 106—120 |
| 3,257,220 | 6/1966 | Kalousek et al. | 106—120 |

JAMES E. POER, *Primary Examiner.*

U.S. Cl. X.R.

252—62